(12) United States Patent
Zey

(10) Patent No.: US 6,237,423 B1
(45) Date of Patent: May 29, 2001

(54) METHOD AND DEVICE TO DETERMINE DELIVERY RATE OR MASS FLOW RATE OF MATERIAL CONVEYED BY A HIGH DENSITY LIQUID PISTON PUMP

(75) Inventor: Wolfgang Zey, Eningen u.A. (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/269,775

(22) PCT Filed: Aug. 23, 1997

(86) PCT No.: PCT/EP97/04601
§ 371 Date: Mar. 31, 1999
§ 102(e) Date: Mar. 31, 1999

(87) PCT Pub. No.: WO98/17979
PCT Pub. Date: Apr. 30, 1998

(30) Foreign Application Priority Data

Oct. 22, 1996 (DE) .............................. 196 43 491

(51) Int. Cl.⁷ .............................. G01F 1/00; F04B 49/00

(52) U.S. Cl. .................................. 73/861; 73/239; 417/63
(58) Field of Search ..................... 73/861, 239; 417/63, 417/124

(56) References Cited

U.S. PATENT DOCUMENTS

| | | | |
|---|---|---|---|
| 4,898,217 | * | 2/1990 | Corbo et al. ............................ 141/83 |
| 5,086,816 | * | 2/1992 | Mieth ..................................... 141/83 |
| 5,388,965 | * | 2/1995 | Fehn ...................................... 417/63 |
| 5,507,624 | * | 4/1996 | Fehn ...................................... 417/53 |
| 5,635,637 | * | 6/1997 | Boult et al. ............................ 73/223 |

* cited by examiner

Primary Examiner—Harshad Patel
(74) Attorney, Agent, or Firm—Pendorf & Cutliff

(57) ABSTRACT

The invention relates to a device and a method to determine the delivery rate or mass flow rate of material conveyed by a high density liquid piston pump (10) through a delivery line (24). The exact determination of the above mentioned variables is achieved by mounting the delivery cylinder (1) in a housing (30) with radial and axial slack and suspending it on at least one weighing cell (36) forming one piece with the housing.

16 Claims, 3 Drawing Sheets

METHOD AND DEVICE TO DETERMINE DELIVERY RATE OR MASS FLOW RATE OF MATERIAL CONVEYED BY A HIGH DENSITY LIQUID PISTON PUMP

BACKGROUND OF THE INVENTION

1. Field of the Invention

The invention concerns a device for determining the delivery rate or the mass flow rate of a material conveyed through a delivery conduit by a high-density liquid piston pump comprising at least a conveyance cylinder and a conveyance piston. During a filling stroke (suction stroke) the conveyance cylinder is filled with a material from a material providing container, and during a pressure stroke, with displacement, the material is emptied into the delivery conduit.

2. Description of the Related Art

Principally with high-density pumps, which are incorporated into a process engineering or engineering chemistry process, there is a requirement to measure and document the mass flow rate and to use this measured value in certain cases as the control value or set value for plant units or equipment situated upstream or downstream or and to incorporate this in a feed back system. This is the case for example in the conveyance of sewage sludge for the incineration of sewage sludge.

Volumetric flow meters in the form of cams-counters for Newtonian fluids are known, which are built into the delivery conduit as "motor" and in which a volume wheel is caused to rotate as a consequence of the pumping process. The revolutions of the volume wheel are added via an impulse disk and converted into volumetric flow in an evaluation unit on the basis of the known displacement volume.

Further, it is known in the case of two-cylinder high-density fluid pumps, to derive the delivery flow rate of the high-density liquid pump having a defined displacement volume from the stroke count. In this measurement method, the amount of filling of the high-density liquid pump must be estimated. For this reason the result can strongly fluctuate on the basis of a changing consistency of the high-density fluid. In order to avoid this problem, it was proposed (DE-A-40 35 515) to determine the amount of filling of the cylinder during each stroke with the help of the most diverse indicators. This method has also been found to be too imprecise for many applications, since for the determination of the mass flow rate in interest it is necessary additionally to determine the density of the material, which causes great fluctuations depending upon the consistency of the high-density or thick stock.

SUMMARY OF THE INVENTION

Beginning therewith it is the task of the invention to develop a device and a process for determining the delivery rate or the mass flow rate of the type described above, with which a precise measurement is possible even during fluctuations in the amount of filling of the conveyance cylinder and over a wide ranging variable consistency of the conveyed material.

The inventive solution, in regard to the process aspect, is based on the idea or concept, that the conveyance cylinder is weighed prior to the carrying out of each fill stroke and prior to the carrying out of each pressure stroke and from the difference of the weighed value the respective fill amount is determined, and that the cycle time of each of the stroke cycles is measured, and that the mathematical computation of the delivery rate or the mass flow rate is calculated taking into consideration the measured fill amounts.

In order to make this possible it is proposed, with regard to the construction aspect, that the conveyance cylinder is provided in a housing with radial and axial slack and is suspended from at least one weighing cell provided secured to the housing. The weighing cell makes possible principally in the turn-around phase of the conveyance piston prior to the carrying out of the filling stroke, and prior to the carrying out of the pressure stroke, an exact mass determination of the empty and the full conveyance cylinder inclusive of conveyance piston, so that respectively by determination of the difference the fill amount can be arrived at.

For avoiding the forces which disturb the measurement precision it is proposed, according to a preferred embodiment of the invention, that at least the part of the conveyance piston guided within the conveyance cylinder is suspended relative to the housing, with radial slack. This can be achieved by suspending the conveyance piston preferably Cardanically from its piston rod with radial slack and/or by elastically suspending the conveyance piston or its piston rod with respect to the housing.

It is envisioned in accordance with a further preferred embodiment of the invention that the housing is formed or designed as a round tube or polygonal tube which surrounds the conveyance cylinder and that on the upper side of the housing two weighing cells are provided in axial separation from each other. The weighing cells are therein advantageously provided on a housing-fixed bearing platform and comprise a spring body armed with a stress or strain measuring strip, while the conveyance cylinder is suspended from the spring body via a carrier rod which extends radially through an opening or aperture in the wall of the housing. The spring body can be formed, for example as a transverse beam, a double transverse beam or shear beam. The aperture through the wall should, for avoidance of an accumulation of dirt which would influence the measurements, be sealed by a gland seal inserted under tension between the rod and the housing wall.

In order to keep the frictional forces occurring during the weighing process as small as possible, it is preferred, when the conveyance cylinder on its charge or in-feed end side is radially slideably supported by a metallic slide ring which is axially elastically supported on the housing. For the same reason the conveyance cylinder should be mounted in the housing with radial slack via an elastic yieldable or deformable quad-ring seal. A further improvement in this respect is thereby achieved, when the conveyance cylinder with its drive side end lies with axial slack radially slideably against an abutment ring, and in the area of its drive side end extends through a housing fixed guide jacket with radial slack.

In a two cylinder high density material pump two conveyance cylinders are preferably provided suspended from weighing cells at the housing with the cylinders provided in a housing with radial and axial slack, of which the conveyance pistons are driven in phase opposition or push pull manner by hydraulic means.

BRIEF DESCRIPTION OF THE DRAWINGS

In the following the invention will be described in greater detail by reference to the drawings. There is shown FIG. 1 a partial break-away perspective representation of a two cylinder high density fluid pump.

DETAILED DESCRIPTION OF THE INVENTION

Figure 1:
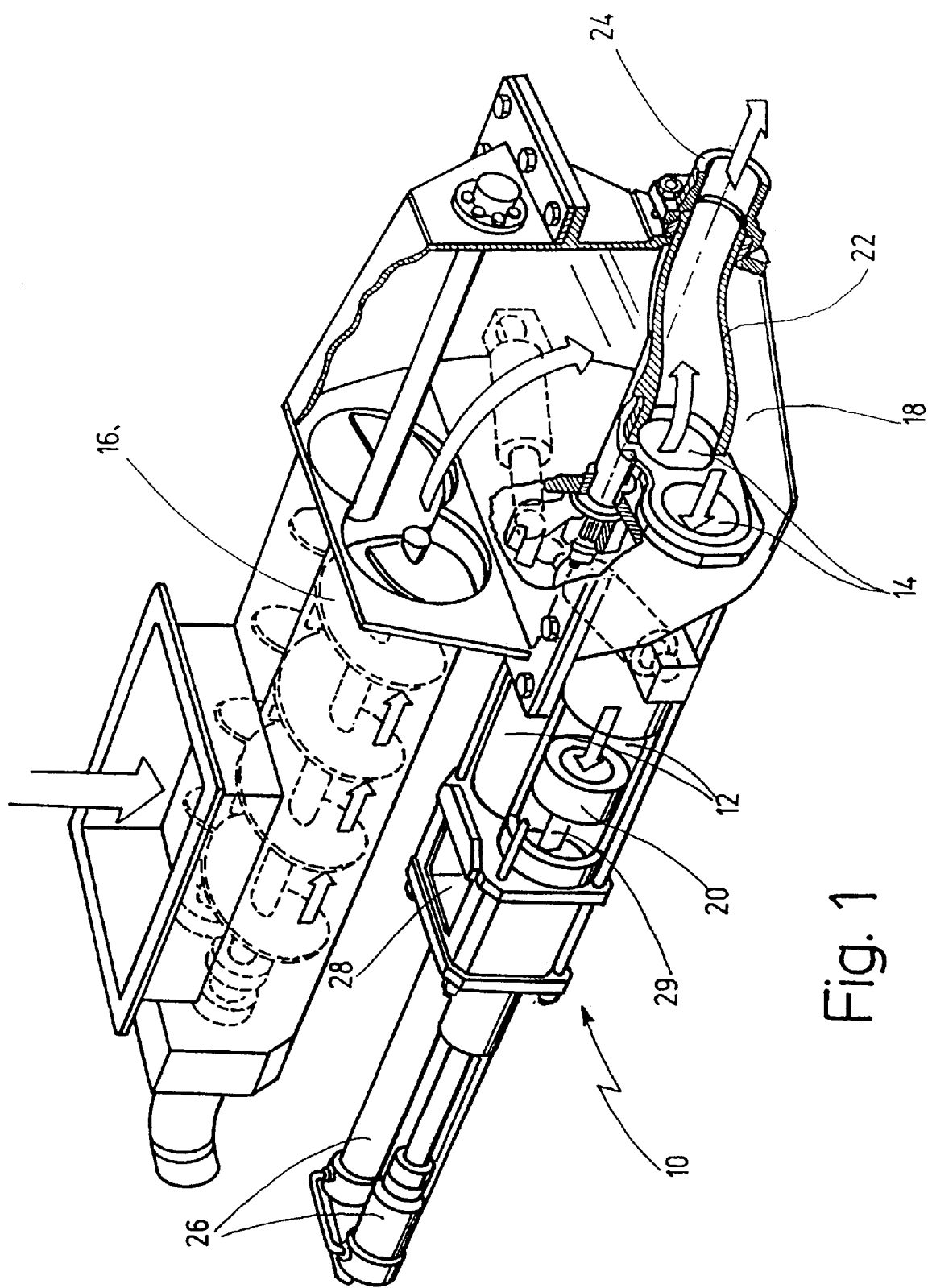
Figure 2:
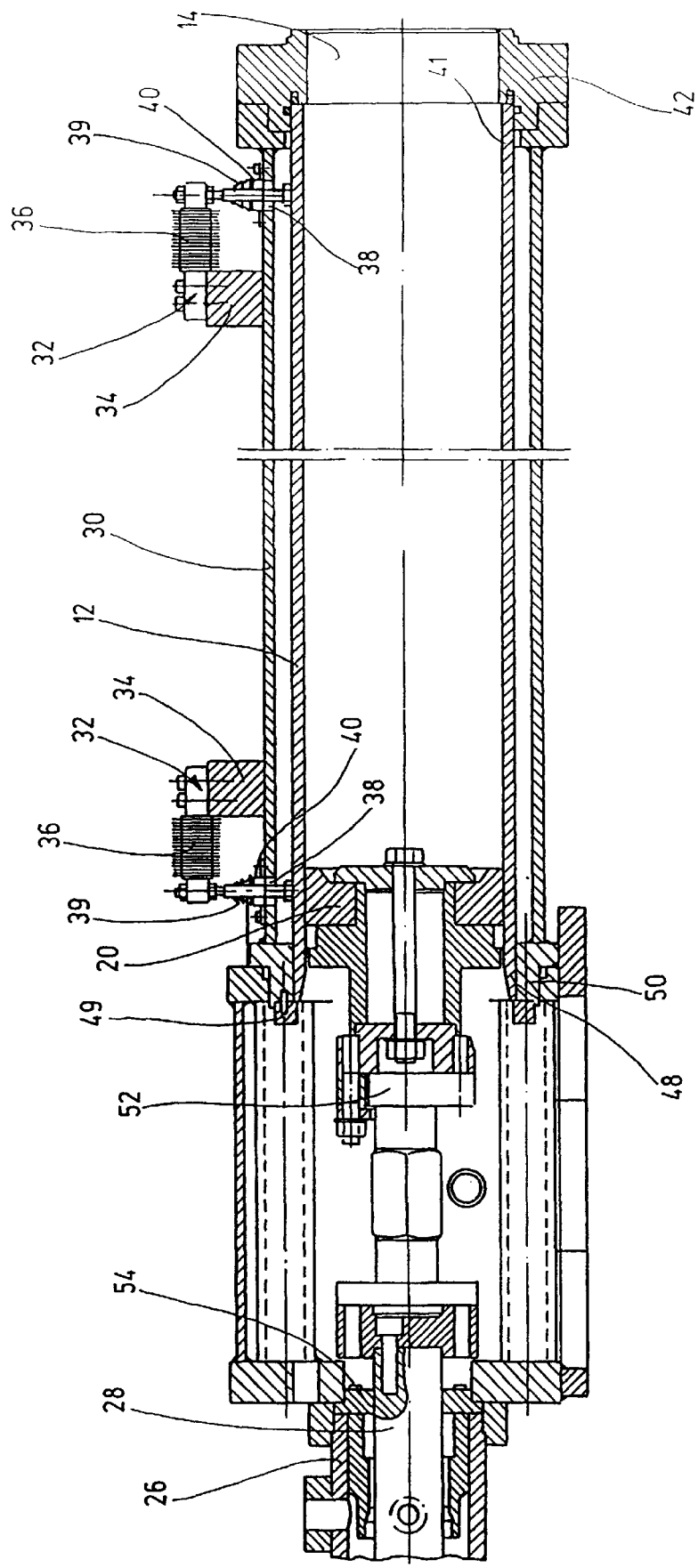
FIG. 2 a section through a conveyance cylinder of the high density fluid pump according to FIG. 1 hung suspended from a weighing cell.
Figure 3:
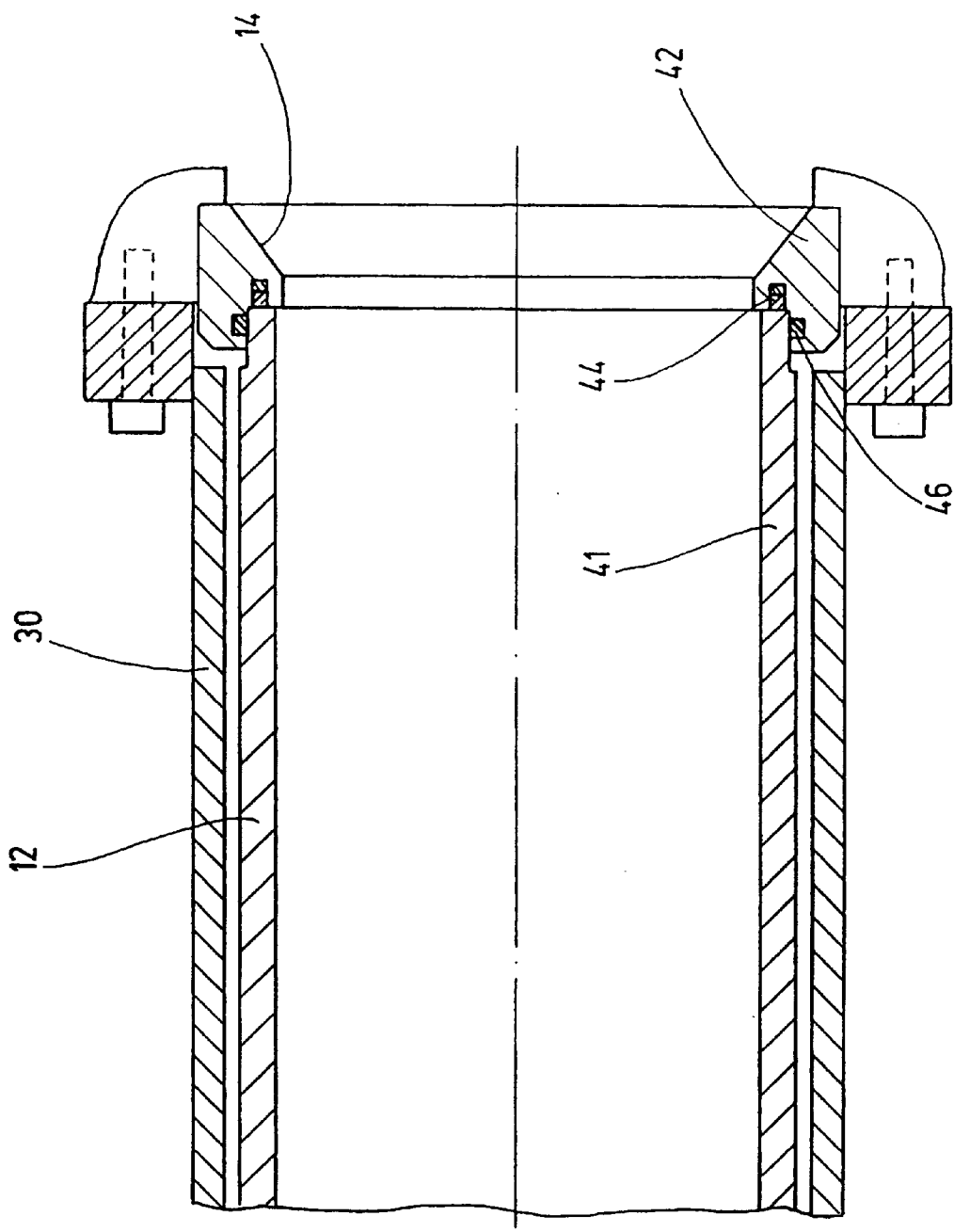
FIG. 3 a portion of the loading or in-feed end of the conveyance cylinder according to FIG. 2 in enlarged representation.

The two cylinder high density fluid pump 10 represented schematically in FIG. 1 is comprised essentially of two conveyance cylinders 12, of which the end openings 14 are, via a double helical or worm-gear mixer 16, in communication with high density fluid material release container 18, and alternatingly have their conveyance piston 20 in communication with a delivery conduit 24 via a branch tube 22 during the pressure stroke, and during the suction or filling stroke of the respective concerned conveyance piston 20 are in communication with the material release container 18 for suctioning of material. The conveyance pistons 20 are driven in opposing phase or push-pull manner via hydraulic drive cylinders 26. Between the drive cylinders 26 and the conveyance cylinders 12 there is found a water box 28 for cleaning the piston rod 29 which extends between the drive cylinders 26 and the conveyance cylinders 12.

For determining the delivery rate or the mass flow rate of the materials pumped by the conveyance cylinders 12 to the delivery conduit 24 the conveyance cylinders 12 are mounted floating in a tubular shaped housing 30 and suspended from weighing devices 32 provided secured to the housing. The weighing devices 32 respectively contain a mounting platform 34 fixed to the housing, a weighing cell 36 comprised of a transverse beam shaped spring body armed with a stress measure strip and a carrier rod 40 with one end mounted on the free end of the transverse beam of the weighing cell 36, extending through hole 38 of the housing 30, and with its other end secured to the outer surface of the conveyance cylinder 12. The through hole 38 is, for avoidance of soiling, sealed by a bellows seal 39 tensioned between the carrier beam 40 and housing 30. The conveyance cylinder 12 is supported at its loading end 41 radially displaceably on a metallic slide ring 44 which in turn is supported axially elastically on a seal carrier 42 fixed to the housing, and via an elastically yieldable quad-ring seal 46 with axial slack is mounted or supported in the seal carrier 42. On its drive end 46 the conveyance cylinder 12 lies with axial slack radially slideable against abutment ring 49 which, for assembly purposes, is removable and adjustable. Further, the conveyance cylinder 12 extends in the area of its drive-side end 48 through a housing fixed guide jacket 50 with radial slack.

In order to avoid the forces of the conveyance piston 20 acting upon the conveyance cylinder which would interfere with the weighting process, the part of the conveyance piston 20 entering in the conveyance cylinder 12 is connected at the connection point 52 with radial slack with its piston rod 29 guided in a housing fixed guide 54.

With help of the weighing cell 36 it is possible to very precisely determine the respective masses of the conveyance cylinder 12 in the two end positions of the conveyance piston 20, and from the differential of the weighing results to calculate the respective fill amount. The thus determined fill amounts can, in further consideration of the likewise measurable stroke count or stroke frequency, be used for determining the mass flow rate through the delivery conduit 24 and for determining the cumulative delivery rate.

In summary the following is to be concluded: The invention concerns a device and a process for determining the delivery rate or the mass flow rate of a material transported through a delivery conduit 24 by means of a high-density piston pump 10.

The exact determination of the precise values is made possible thereby, that the conveyance cylinder 12 is provided in the housing 30 with radial and axial slack and is hung up on at least one weighing cell 36 provided secured to the housing.

What is claimed is:

1. A device for determining the delivery rate or the mass flow rate of a material conveyed through a delivery conduit (24) by a high-density piston pump (10), the device comprising:

at least one conveyance cylinder (12) having a load end and a drive end;

at least one conveyance piston (20) axially slidable in said conveyance cylinder (12);

a housing (30) provided around said at least one conveyance cylinder (12);

and at least one weighing cell (36) provided fixed to the housing;

wherein said conveyance cylinder (12) is provided in said housing (30) suspended from said weighing cell (36) with radial and axial slack.

2. A device according to claim 1, including a piston rod connected to said conveyance piston (20), wherein at least the part of the conveyance piston (20) introduced in the conveyance cylinder (12) is suspended with radial slack relative to the housing (30).

3. A device according to claim 2, wherein the piston rod of the conveyance piston (20) is suspended with radial slack.

4. A device according to claim 3, wherein the piston rod of the conveyance piston (20) is suspended Cardanically.

5. A device according to claim 2, wherein the conveyance piston (20) or its piston rod (29) is elastically suspended relative to the housing (30).

6. A device according to claim 1, wherein the housing (30) is formed as a round tube or multi-sided tube encompassing said conveyance cylinder (12).

7. A device according to claims 1, wherein the conveyance cylinder (12) is oriented horizontally within the housing (30) and wherein two weighing cells (36) are provided on the upper side the housing with axial separation from each other.

8. A device according to claim 7, wherein the weighing cells (36) are provided on a mounting platform (34) fixed to the housing, wherein said weighing cells include a spring body armed with a stress measuring strip, and wherein the conveyance cylinder (12) is suspended from the spring body by a carrier rod (40) which extends through a wall aperture (38) of the housing (30).

9. A device according to claim 8, wherein the spring body is formed as a transverse beam, double transverse beam or shear beam.

10. A device according to claim 8, wherein the wall aperture (38) is sealed by a bellows seal (39) mounted under tension between the carrier rod (40) and the housing wall (30).

11. A device according to claim 1, wherein the conveyance cylinder (12) is radially displaceably supported on its load end (41) on a metallic slide ring (44) which is supported axially elastically in the housing (30).

12. A device according to claim 1, wherein the conveyance cylinder (12) is mounted on the housing (30) with radial slack via an elastic yieldable quad-ring seal (46).

13. A device according to claim 1, wherein the conveyance cylinder (12) rests with its drive side end (48) with axial slack radially slideable against an abutment or stop ring (49).

14. A device according to claim 1, wherein the conveyance cylinder (12) in the area of its drive end (48) extends with radial slack through a guide jacket (50) fixed to the housing.

15. A device according to claim 1, wherein two conveyance cylinders (12) are provided in the housing (30) with radial and axial slack, suspended via weighing cells (36) in the housing (30), of which the conveyance pistons (20) are driveable in push pull or opposing phase manner by hydraulic means (26).

16. A process for determining the delivery rate or the mass flow rate of a material conveyed through a delivery conduit (24) by a high-density piston pump (10) comprising at least one conveyance cylinder (12) and conveyance piston (20), wherein during a filling stroke (suction stroke) the conveyance cylinder is filled with a material, for example, from a material providing container, and during a pressure stroke, with displacement, the material is emptied into the delivery conduit (24), wherein the conveyance cylinder (12) is weighed prior to the carrying out of each respective fill stroke and prior to the carrying out of each respective pressure stroke, that the respective fill amounts are calculated from the differential in the weight values, and that the cycle time of each respective stroke cycle is measured, and that by taking into consideration the measured fill amounts the mathematical computation of the delivery rate or the mass flow rate is calculated.

* * * * *